United States Patent [19]
Saunders

[11] 3,772,796
[45] Nov. 20, 1973

[54] APPARATUS FOR LINEAR MEASUREMENT OF SHEETS
[75] Inventor: William T. Saunders, Weirton, W. Va.
[73] Assignee: National Steel Corporation, Pittsburgh, Pa.
[22] Filed: Feb. 12, 1971
[21] Appl. No.: 114,967

[52] U.S. Cl. .............................. 33/147 E, 33/172
[51] Int. Cl. ............................................. G01b 5/06
[58] Field of Search ...................... 33/147 E, 147 R, 33/147 J, 147 N, 147 L, 172 R, 174 R, 165

[56] References Cited
UNITED STATES PATENTS
914,855    3/1909   Mastrangel .................... 33/147 E
3,235,968  2/1966   Wertepny ....................... 33/147 J
1,210,557  1/1917   Stanbery ........................ 33/147 R FOREIGN PATENTS OR APPLICATIONS
200,787    1908    Germany ......................... 33/147 K Primary Examiner—Harry N. Haroian
Attorney—Shanley & O'Neil

[57] ABSTRACT

Apparatus for highly accurate and rapid measurement of linear dimensions of sheet material including a support surface for sheets, means for accurate alignment of a sheet with a slidable measuring head, self centering seating features for the measuring head, coordinated dial gage means for accurate indications of fractional values intermediate scale markings along the work surface, and magnet means for holding magnetic sheets to the work surface for measurement.

11 Claims, 4 Drawing Figures

INVENTOR
WILLIAM T. SAUNDERS

BY Shanley & O'Neil
ATTORNEYS

APPARATUS FOR LINEAR MEASUREMENT OF SHEETS

This invention is concerned with high accuracy dimension measuring apparatus for sheet materials, in particular metal sheets such as plated steel.

Tinplated and other coated and non-coated flat rolled steel product has many uses in which it is customarily sold in sheets of predetermined length and width dimensions. Accuracy in the cutting of these sheets is required in order to maximize the number of parts, such as can end or bottle cap blanks, cut from the sheets. Off sizes in the sheet material can diminish the number of blanks per sheet or increase the amount of scrap per sheet, either of which is uneconomical for the metal fabricator.

There has been no high speed, high accuracy apparatus for the use of mills manufacturing such sheet material. The purpose of the present invention is to provide a gage which can provide high accuracy readings, which is easy to operate with self-aligning features so as to facilitate rapid measurement, and which possesses characteristics which substantially eliminate breakage and inaccuracies due to usage.

In further description of the invention reference will be had to the accompanying drawings briefly described below:

Figure 1:
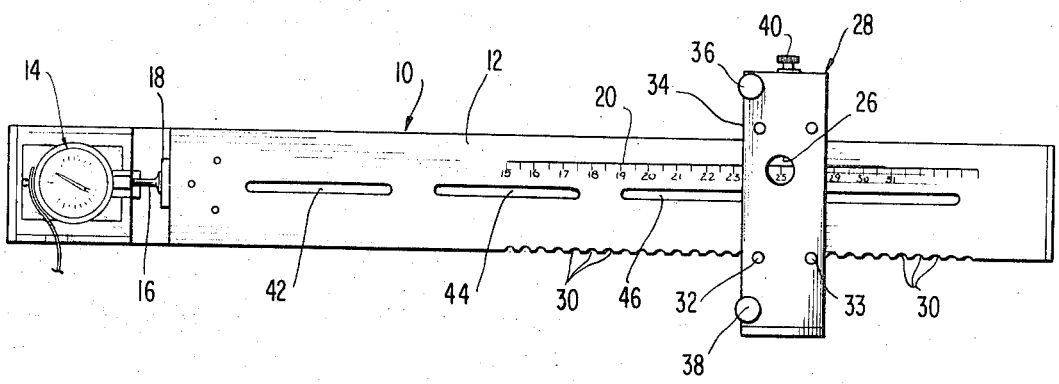
FIG. 1 is a plan view of measuring apparatus of the present invention.

The measuring apparatus of the present invention includes an elongated support member 10 having a work surface 12.

Mounted at one longitudinal end of the support member 10 is a dial gage apparatus 14 including plunger head 16 in contact with gage block 18. The latter accurately maintains a "zero" reading position for the plunger. Scale gradation indicia 20 extend along the longitudinal axis of the elongated support member. Such indicia are viewable through window 26 of slidable measuring head means 28.

Support member 10 includes notches 30 in accurately spaced relationship along a longitudinal edge. Notches 30 are in accurately established, fixed-positional relationship to each indicia of the scale. Considering this relationship in more detail, slidable measuring head means 28 carries contact rods operable in coaction with notch means 30 for seating the slidable measuring head means. In the specific embodiment shown, the indicia are at half inch intervals and the notch means half inch centerlines for the contact bars 32.

An alignment means 34, of the slidable measuring head means 28, which in use is longitudinally opposite to the gage plunger means 18, makes provision for "squaring" the contact with sheet material being measured. By this provision, measurements are made along an axis which is normal to the edge of the material being measured.

Alignment means 34 preferably includes contact means, e.g., two point contact rolls 36 and 38, to assure "square" alignment of the sheet material, i.e., to permit measurement normal to the edge of the material.

In some utilization it would be desirable to lock the slidable measuring head means 28 in position periodically. Lock screw 40 is provided for this purpose.

Extending longitudinally along the surface of the support means and recessed from the work support surface 12 are magnets 42, 44 and 46 for holding magnetic sheet material to the surface during measurement.

Figure 2:
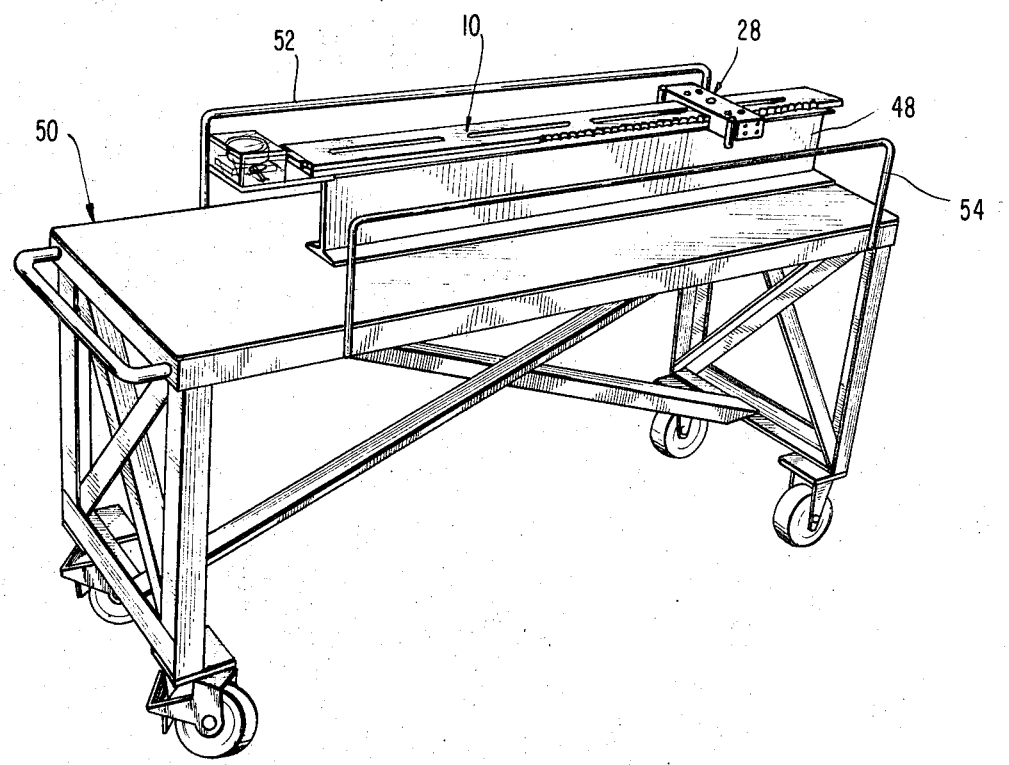
FIG. 2 is a perspective view of a preferred embodiment of the measuring apparatus of the present invention for measuring flexible metal sheets.

As shown in FIG. 2 the measuring apparatus of FIG. 1 is supported by beam 48 on movable table means 50. Also supported by the table means are longitudinally extended auxiliary support arms 52, 54 secured to table 54 and extending substantially parallel to the support structure 10. With a planar work surface 12 for measuring flat sheet materials these auxiliary support means can be provided to lie in the same plane as work surface 12. They can be readily mounted to be adjustable.

Figure 3:
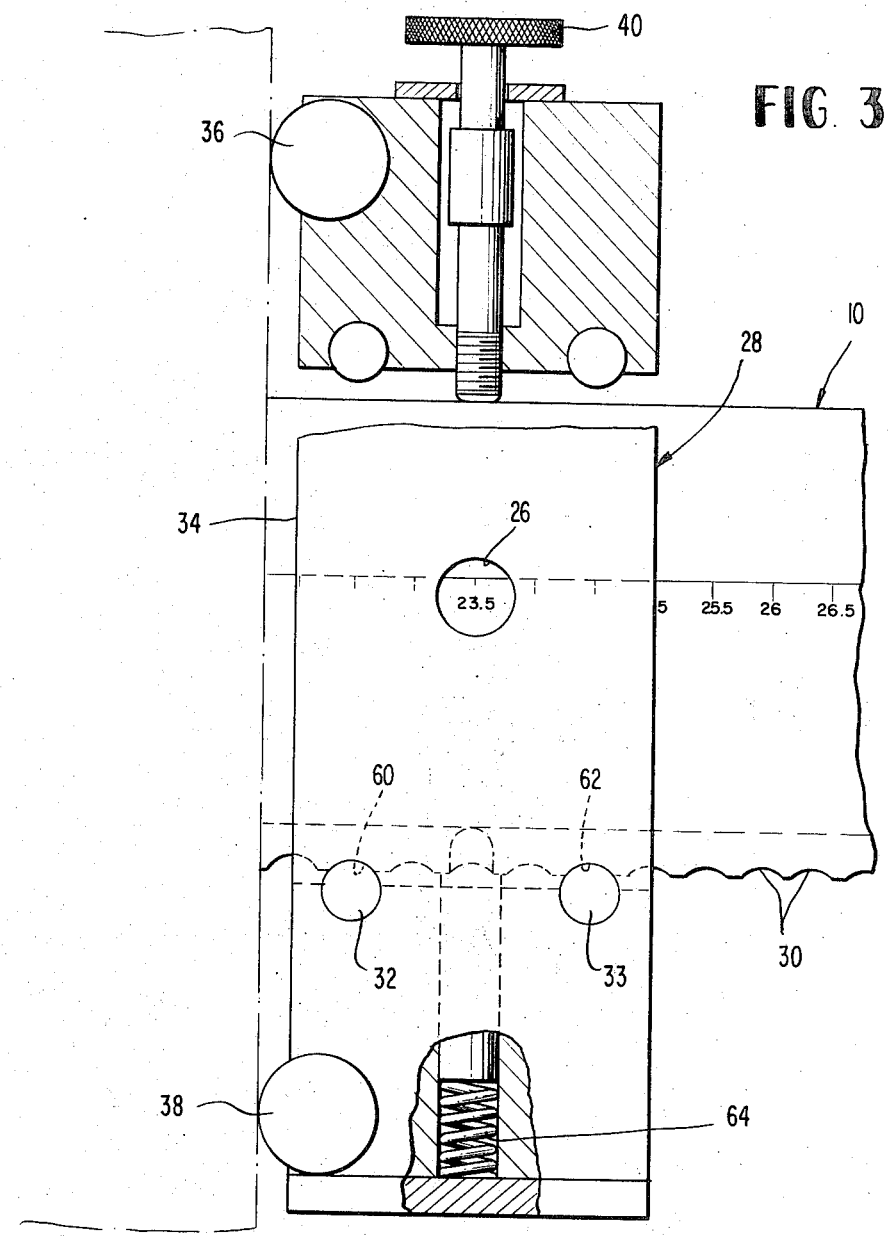
FIG. 3 is a detailed plan view of the slidable measuring head member of the present invention, partially cut away and partially schematic, for indicating operation.

As shown in FIG. 3, the slidable measuring head 28 is carried on support means 10 with the contoured seating rods 32 and 33 seated in place along the notch containing edge. As shown they are seated in notches 60 and 62, which in the particular embodiment are two inches apart in practice. When so seated, in the specific embodiment shown, the reading 23.5 inches appears in window 26 of slidable measuring head 28. Note that this indicia 23.5 is half way between the seating rods 32, 33.

Spring means 64 shown in the partially cut away portion help seat the slidable measuring head 28 with pressure being applied to seat the contact rods 32, 33 in the notches 60, 62 by locking means 40. The slidable measuring head member 28 can be locked in position along the support means 10 by locking head 40. When locking means 40 is released spring 64 facilitates release of the accurately self-seating positions of the contact rods 32, 33 so that measuring head means 28 can be readily moved to a new position.

The indicia are in preselected relationship, in the present embodiment half inch increments, along the surface of the support means. When a specimen being measured includes some fractional value between the scale indicia, that is, some fraction of a half inch in the embodiment shown, this fractional reading is made accurately by the dial gage at the opposite longitudinal end of the structure.

Figure 4:
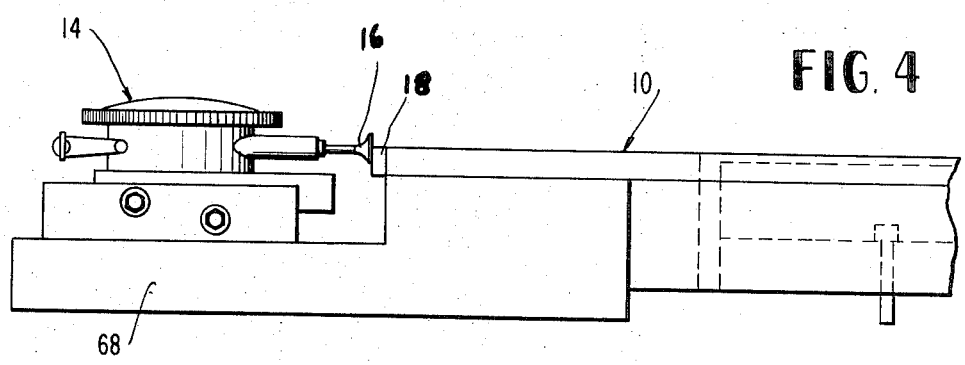
FIG. 4 is a detailed side elevational view of dial gage means and a portion of the support member of the present invention.

Referring to FIG. 4, dial gage 14 is mounted on a recessed platform 68 with the plunger 16, when the gage is at a zero reading, contacting the accurately positioned gage block 18.

The matching contours of the contact rods and notches provide for even seating and continually accurate seating of the measuring head means notwithstanding continued use and wear. The contact means along the measuring head edge enable quick set up of a "squared" relationship for the sheet being measured. The result is highly accurate reading, easily and quickly obtained.

Variations in individual mechanisms shown for purposes of disclosing the invention will be possible in view of the present teaching. Where the principles of the present invention are maintained such variations should be deemed to fall within the scope of the appended claims.

I claim:

1. Linear measuring apparatus for accurate and rapid length measurements of sheet material, such as flat rolled metal sheets, comprising an elongated work surface forming part of support means for sheet material, length indicia at predetermined accurately spaced intervals along the longitudinal dimension of such support means, positioning means comprising notch means having a circular configuration spaced longitudinally along the support means in predetermined fixed positional relationship to the length indicia, measuring head means mounted on the support means for sliding movement longitudinally along the support means, the measuring head means including window means for reading length indicia, seating means integral with the slidable measuring head means comprising at least two rods having an external surface presenting at least in part a cylindrical configuration conforming to the circular configuration of the notch means to provide for self-centering seating of the measuring head means along the support means, the two rods being spaced on the slidable measuring head means and keyed with relation to the positioning means so as to bracket an indicia marked on the support member when the rods are in seated position in the notch means to permit reading of length indicia through the window means, the slidable measuring head means including means transverse to the longitudinal axis of the support means for aligning the sheet material being measured in squared relationship with the slidable measuring head means and, gage means for indicating fractional measurements of the sheet material intermediate the predetermined space intervals between length indicia, such gage means being positioned at one longitudinal end of the support means in longitudinally opposed relationship to the means for aligning sheet material and including actuator means for contacting an edge of a sheet being measured in longitudinally opposed relationship to the aligning means contact with such sheet material.

2. The apparatus of claim 1 in which the slidable measuring head means is spring loaded to facilitate unseating of the positioning means.

3. The apparatus of claim 2 in which the slidable measuring head means further includes lock means for locking such slidable means in position after seating.

4. The apparatus of claim 1 in which the means for aligning sheet material comprises means having two point contact lying in the same plane, which plane is transverse to the longitudinal axis of the support means and intersected perpendicularly by such axis.

5. The apparatus of claim 1 in which the support means includes recessed magnet means for holding magnetic sheet material to the elongated work surface.

6. The apparatus of claim 1 further including longitudinally extended support arms spaced on opposite lateral sides of the elongated work surface for supporting sheet material.

7. The apparatus of claim 1 mounted on a mobile table means.

8. The apparatus of claim 1 in which the length indicia are positioned centrally along the longitudinal axis of the elongated work surface.

9. The apparatus of claim 11 in which the gage actuator means are positioned along an extension of the longitudinal axis of the elongated work surface.

10. The apparatus of claim 1 in which the gage means comprises a dial gage for accurately indicating measurements of linear distances at least as great as the distance between spaced indicia along the support means.

11. The apparatus of claim 9 in which the means for aligning sheet material comprises roll means positioned to contact sheet material at equidistant points on opposite lateral sides of the centrally located longitudinal axis of the elongated work surface.

* * * * *